United States Patent [19]

Kugler

[11] 4,270,374
[45] Jun. 2, 1981

[54] METHOD OF AND DEVICE FOR FORMING AN INTEGRAL LUBRICATING NIPPLE ON A TUBULAR MEMBER

[75] Inventor: Manfred Kugler, Lohmar, Fed. Rep. of Germany

[73] Assignee: Jean Walterscheid GmbH, Lohmar, Fed. Rep. of Germany

[21] Appl. No.: 56,195

[22] Filed: Jul. 10, 1979

[30] Foreign Application Priority Data

Jul. 15, 1978 [DE] Fed. Rep. of Germany ....... 2831187

[51] Int. Cl.³ .................... B21C 37/15; B21D 22/18; B21C 37/28

[52] U.S. Cl. .......................... 72/68; 72/370; 72/125

[58] Field of Search .............. 72/68, 125, 370, 453.01, 72/453.14; 29/157 B, 157 C, 157 T

[56] References Cited

U.S. PATENT DOCUMENTS

| | | | |
|---|---|---|---|
| 1,921,584 | 8/1933 | Robinson | 29/157 T |
| 1,994,034 | 3/1935 | Carroll | 72/68 |
| 2,210,107 | 8/1940 | Thomas et al. | 29/157 B |
| 2,240,319 | 4/1941 | Taylor | 29/157 T |
| 2,910,897 | 11/1959 | Huet | 29/157 T X |
| 3,209,439 | 10/1965 | Arbogast | 29/157 T |
| 3,442,106 | 5/1969 | Gray, Jr. et al. | 29/157 T X |
| 4,052,880 | 10/1977 | Cullinan et al. | 72/370 X |

FOREIGN PATENT DOCUMENTS

| | | | |
|---|---|---|---|
| 519306 | 5/1953 | Belgium | 72/453 |
| 570157 | 8/1958 | Belgium | 29/157 T |
| 1034125 | 7/1958 | Fed. Rep. of Germany | 72/342 |
| 85048 | of 1971 | Fed. Rep. of Germany | 72/457 |
| 179440 | 5/1962 | Sweden | 29/157 T |
| 342823 | 1/1960 | Switzerland | 72/342 |
| 754431 | 8/1956 | United Kingdom | 72/453 |

*Primary Examiner*—Lowell A. Larson
*Attorney, Agent, or Firm*—Toren, McGeady and Stanger

[57] ABSTRACT

An integral lubricating nipple is formed on a tubular member, first, by pressing a conically shaped hollow lug outwardly from the tubular member and then by applying rotatable pressure jaws against the conically shaped lug to provide the finished surface configuration of the nipple. While the pressure jaws are shaping the lug, a punching die cuts a lubricating bore through the outer end of the lug into its hollow interior. Compressed air can be supplied for clearing any material particles resulting from the punching of the lubricating bore.

7 Claims, 3 Drawing Figures

METHOD OF AND DEVICE FOR FORMING AN INTEGRAL LUBRICATING NIPPLE ON A TUBULAR MEMBER

SUMMARY OF THE INVENTION

The present invention is direction to a method of and a device for forming a lubricating nipple as an integral part of a tubular member, such as an outer bearing tube, by a deep drawing operation.

Conventional lubricating nipples usually consist of a grease head and a fastening part. In many cases, the fastening part is threaded so that it can be screwed into a corresponding bore in the carrier part. In another embodiment, a cylindrically or conically shaped pin is used as the fastening part and it is driven into a corresponding bore with a press fit.

The manufacture and assembly of such known lubricating nipples, produced initially as separate parts, is very elaborate, since the nipple must be produced in a metal cutting operation and, in addition, the carrier part receiving the lubricating nipple must be provided with a threaded opening or a bore.

In addition to the elaborate production and assembly operations involved with such known lubricating nipples, sealing problems occur at the joint between the nipple and its carrier part, especially when the carrier part is exposed to strong vibrations. As a result, the nipples become loose after a period of time and may even become lost, so that dirt finds its way into the grease or oil duct.

Therefore, the primary object of the present invention is to minimize the cost of manufacturing and assembling the lubricating nipple while avoiding any reduction in strength of the carrier part to which the nipple is secured.

In accordance with the present invention, initially, a hollow lug is pressed outwardly from a tubular member without affecting the integrity of the tubular member wall, that is, the wall is not perforated as a part of the lug forming operation. The lug as formed has a conically shaped tip located outwardly from the outer surface of the tubular member. Subsequently, the exterior surface of the lug is shaped without cutting away any material so that it has a bottle-shaped surface extending from the outer surface of the tubular member followed by a hemispherically shaped surface and then by the conically shaped tip of the nipple. While the exterior surface of the nipple is being formed a lubricating bore is punched through the tip into the hollow interior of the lug.

The lubricating nipple with its conically shaped head or tip is produced in two forming operations. There is no assembly required at all, since the nipple is formed integrally with the receiving part which may be in the form of a tubular member. As a result, no sealing problem exists between the nipple and the receiving part and further, the loss of the lubricating nipple is not possible even over prolonged periods of use. Since the structure of the receiving part is not cut or perforated when the lug for forming the lubricating nipple is pressed outwardly, due to the deep drawing operation used, there is not appreciable reduction in strength of the receiving part. The loss of strength caused by the punching operation in forming the lubricating bore with a diameter of only a few tenths of a millimeter, is negligible.

In one embodiment of the invention, the method involves the use of a device with a first working station at which the hollow lug is formed and a second working station where pressure jaws are pressed against the exterior surface of the hollow lug for forming the finished surface configuration of the nipple. The pressure jaws provide the outside surface of the nipple with a hemispherically shaped surface extending from the conical tip and a bottleneck-shaped surface extending between the hemispherically shaped surface and the outer surface of the receiving part. At the outset of the operation in the second working station, the pressure jaws are moved out of a spindle insert into contact with the lug and then an adapter, forming a part of the spindle insert, laterally contacts an outer frustoconical surface on the pressure jaws so that the shaping of the nipple can be effected. The inner surface of the pressure jaws is complementary to the finished surface configuration of the lubricating nipple.

With the device described above, the lubricating nipple with a conically shaped head can be formed in two operations each at a different working station. In the second part of the forming operation, the lubricating nipple is provided with a hemispherically shaped undercut surface with a bottleneck-shaped surface extending between the hemispherically shaped surface and the outside surface of the tubular member. This shaping of the lubricating nipple is effected by rotating pressure jaws without the removal or cutting of any of the material forming the nipple. The placement of feeding or pressure jaws which effect the undercutting operation merely requires the placement of the jaws against the outside surface of the tubular member and then moving an adapter member over the pressure jaws to obtain the desired shaping of the nipple. No controlled feed or adjustment is required.

Another significant feature of the invention is that the punching die is retained within the pressure jaws and is axially stationary relative to the spindle insert in which the pressure jaws are movably mounted.

The formation of the lubricating bore through the tip of the nipple is effected along with the operation involving the undercut configuration of the nipple as the spindle insert is directed inwardly toward the tubular member. Another feature of the invention involves the use of compressed air to blow out any material separated from the nipple in the formation of the lubricating bore.

Accordingly, any material removed as the lubricating bore is punched out of the tip end of the nipple can be blown away and cannot interfere with further operations.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
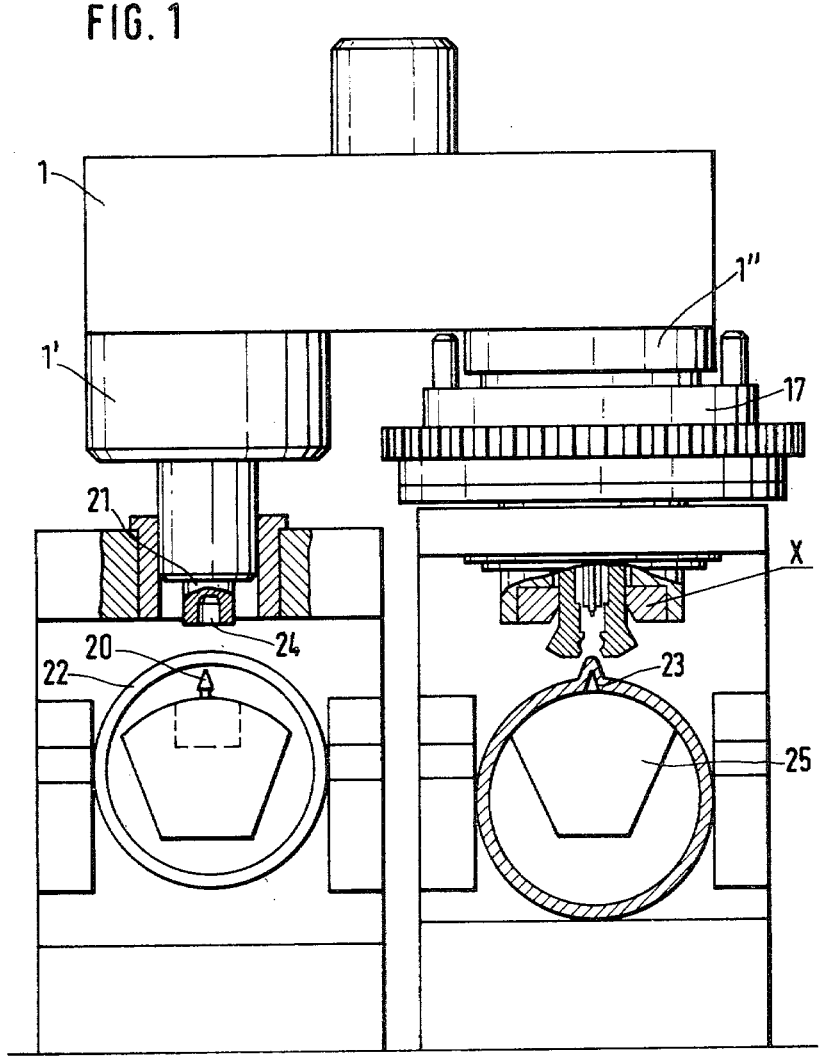
FIG. 1 is a side view, partly in section, of two working stations in the formation of a lubricating nipple on a tubular member with a lug being displaced outwardly from the tubular member at the first station and then being provided with the desired final shape in the second station.

In FIG. 1 a device is illustrated forming two working stations 1′ 1″. The two working stations 1′ and 1″ are combined as a unit on a receiving frame 1.

In working station 1′ a rigid pushing mandrel 20 is located within a tubular member 22 and an adjustable pusher die 21 is located opposite the mandrel on the exterior of the tubular member. By moving the pusher die 21 downwardly against the tubular member, a hollow lug 23 is pressed outwardly from the wall of the tubular member 22 into the recess 24 in the die. The pushing mandrel 20 is conically shaped so that it provides a conically shaped lug projecting outwardly from the tubular member.

After the forming of the deep drawn hollow lug 23 in the tubular member 22, the tubular member is removed from the first working station 1′ and introduced into the second working station 1″ where it is supported on a stationary abutment 25 located within the tubular member and supporting the inside surface from which the hollow lug 23 was formed.

Figure 2:
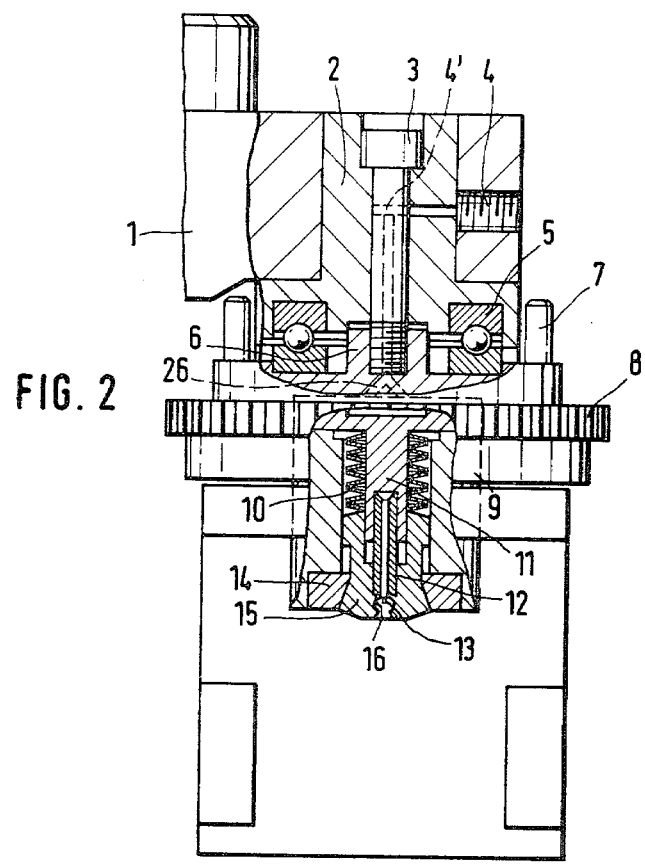
FIG. 2 is a partial sectional view of the device located at the second working station for providing the desired finished outside shape for the lubricating nipples.

At the second working station 1″, as shown in FIG. 2, a spindle insert 9 is rotatably mounted in a ball bearing 5 and is secured by an extension 6 of carrier plate 17 on a stationary receiving pin 2 by a tightening screw 3. An air connection 4 extends through the receiving frame 1 into the receiving pin 2 and is connected to an air duct 4′ extending axially through the tightening screw 3. Compressed air can flow through the air connection 4 into air duct 4′ and then through air channels shown in dotted lines through the extension 6 into the interior of the spindle insert 9 to the point at which the device works on the lug drawn out of the tubular member.

Carrier pins 7 rotatably connect a gear wheel 8 to the carrier plate 17 and the gear wheel, when rotated by an electromotor, not shown, in turn, rotates the spindle insert. As viewed in FIG. 2, the spindle insert number 9 includes a conically or tapered adapter 14 at its lower end and the adapter is annular in shape and has an inner frusto-conical surface 29 which laterally encircles and cooperates with an outer frusto-conical surface 28 on pressure jaws 15 located within the adapter 14 and extending downwardly from the lower end of the spindle insert. In the rest position, pressure jaws 15 are displaced outwardly from the adapter 14 by the cup springs 10, note FIG. 1, working station 1″, where the pressure jaws extend downwardly away from the adapter 14 toward the tubular member 22 in position to be worked. The cup springs 10 laterally encircle a punching die receiver 11 within which a punching die guide 12 is located. A punching die 13, note FIG. 3, is positioned within the guide 12 and bears at its rear or upper end against the punching die receiver 11.

For shaping the outside surface of the lug 23, particularly the hemispherical surface 19 and the bottle-neck shaped surface 27, the rotatable spindle insert is moved toward the tube 22. The rotational drive for the spindle insert 9 is transmitted by gear wheel 8 over carrier pins 7 to the carrier plate 17 with its extension 6. Since the pressure jaws have been displaced outwardly from the adapter 14 in spaced relationship from the interior frusto-conical surface 29, by the action of the cup springs, the movement of the spindle insert in its axial direction toward the tubular member causes the inner frusto-conical surface 29 of the adapter 14 to contact the complementary shaped frusto-conical surface 28 on the outer surface of the pressure jaws 15 so that the jaws embrace the conically shaped exterior surface of the hollow lug 23.

Figure 3:
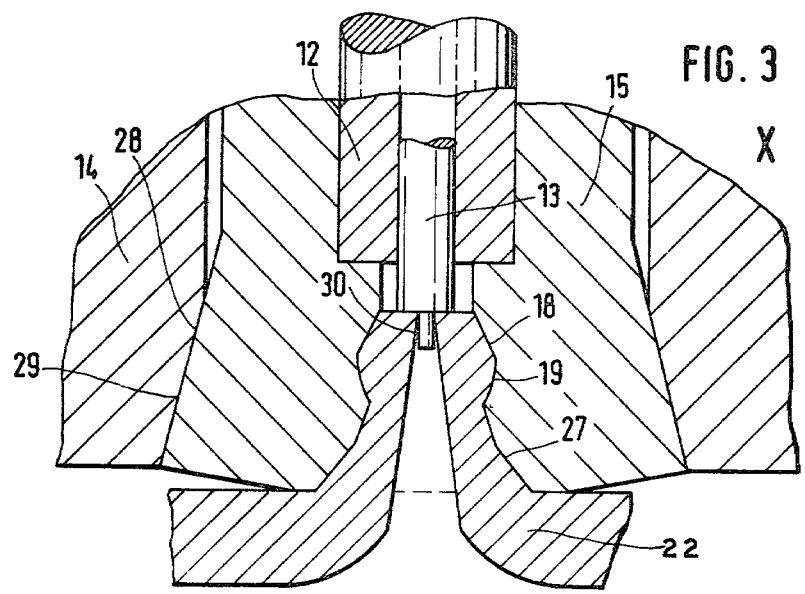
FIG. 3 is an enlarged view of the portion of the device shown in the right-hand side of FIG. 1 and designated by X.

With the pressure jaws 15 pressed outwardly by the cup springs 10 into contact with the exterior surface of the tubular member 22, the axial movement of the spindle insert 9 causes the complementary frusto-conical surfaces 29 and 28 to contact, such as shown in FIGS. 2 and 3. With the frusto-conical surface 29 of the adapter 14 pressing inwardly against the outer frusto-conical surface 28 of the pressure jaws, the shaped configuration 16 of the interior of the pressure jaws is pressed radially inwardly and effects the formation of the undercut hemispherically shaped ball surface 19 extending inwardly from the lower end of the conically shaped tip or head 18 of the nipple and the bottle-necked shaped surface which extends between the outer surface of the tubular member 22 and the inner end of the hemispherically shaped surface 19.

As initially shaped, the integrity of the surface of the tubular member 22 is maintained in the formation of the conically shaped hollow lug 23, that is, there is no perforation or opening through the tube member wall. During the formation of the finished surface of the lubricating nipple, as shown in FIG. 3, with the movement of the spindle insert 9 toward the tubular member, the punching die 13 pushes through the tip end of the nipple forming a lubricating bore of small diameter. The formation of the lubricating bore does not involve any significant loss of strength, since the diameter of the bore is only a few tenths of a millimeter.

After completing the formation of the finished outer surface of the lubricating nipple, the spindle insert 9 is lifted off the nipple and the pressure jaws are displaced out of the adapter 14 by the cup springs 10 and the jaws slide off the tip end of the nipple which is not shaped in the operation carried out at the second working station 1″. Any chips separated when the lubricating bore 30 is punched out of the nipple, are removed by compressed air through the air connection 4, the air duct 4′, and the air channels 26 which extend from the air duct to the location at which the nipple is shaped by the pressure jaws.

FIG. 3 displays a section through a portion of the outer part of the spindle insert as the finished surface of the lubricating nipple is being shaped. The pressure jaws 15 have surfaces complementary to the finished surfaces of the lubricating nipple consisting of the conical head or tip 18, the hemispherically shaped surface 19 converging inwardly from the adjacent end of the conical surface 18 and the bottle-necked shaped surface 27 extending between the outer surface of the tubular member 22 and the closer or inner end of the hemispherically shaped surface 19.

While specific embodiments of the invention have been shown and described in detail to illustrate the application of the inventive principles, it will be understood that the invention may be embodied otherwise without departing from such principles.

What is claimed is:

1. Method of forming a lubricating nipple with a conically shaped head on a tubular member, such as an outer bearing tube, comprising the steps of deep drawing the wall of the tubular member outwardly by pressing a portion of the wall outwardly into a die and forming a hollow conically shaped lug with a conical tip projecting outwardly from the outside surface of the tubular member, shaping the outside surface of the conically shaped lug without any material removed therefrom including shaping the surface inwardly of the conical tip and forming a hemispherically shaped surface converging inwardly from the inner end of the conical tip and spaced outwardly from the outside surface of the tubular member and from the inner end of the hemispherically shaped surface forming a bottle-necked surface from the inner end of the hemispherically shaped surface to the outside surface of the tubular member, forming the bottle-necked shaped surface with generally conically shaped outside surfaces diverging in the direction from the hemispherically shaped surface to the outside surface of the tubular member, the step of shaping the outside surface of the conically shaped lug comprising applying the surface of a shaped member which surface has a configuration complementary to the desired outside finished surface of the lubricating nipple into contact with the outside surface of the conically shaped lug, rotating the shaped member relative to the lug, and opening the tip of the lug for forming a passageway into the hollow interior of the lug during the shaping of the outside surface of the conically shaped lug so that the combination of the passageway and the hollow interior form a lubricating bore.

2. A device for forming a lubricating nipple as an integral part of a tubular member comprising a rigid mandrel arranged to be positioned within the tubular member, an adjustable die arranged opposite said mandrel so that the tubular member is positioned therebetween and said die being movable into contact with the tubular member so that a generally conically shaped hollow lug is pressed by said mandrel outwardly from the tubular member into said die, said mandrel and die forming a first working station, a stationary abutment spaced from said rigid mandrel and arranged to be positioned within the tubular member for supporting the interior surface of the tubular member from which the conically shaped lug has been formed, a support member located opposite said stationary abutment so that the tubular member is positioned therebetween, a spindle insert mounted on said support member and having an axis extending transversely of the axis of the tubular member and being movable toward and away from said stationary abutment in the axial direction thereof, means mounted on said support member for rotating said spindle insert, said spindle insert including pressure jaws, means for displacing said pressure jaws outwardly from and in the axial direction of said spindle insert toward said stationary abutment, said pressure jaws having an interior surface configuration complementary to the finished surface configuration of the lubricating nipple and a circumferential exterior surface having a frusto-conical shape with the surface thereof converging inwardly in the direction outwardly away from said stationary abutment, said spindle insert including a tapered adapter laterally encircling said pressure jaws and having a frusto-conically shaped circumferential interior surface complementary to the frusto-conical exterior surface on said pressure jaws for engagement therewith for providing inwardly directed force through said pressure jaws for shaping the outside surface of the lug into a surface configuration complementary to the surface configuration of the interior surfaces of said pressure jaws.

3. A device, as set forth in claim 2, wherein said means for displacing said pressure jaws outwardly comprises springs located within said spindle insert.

4. A device, as set forth in claim 3, wherein said springs for displacing said pressure jaws comprises a plurality of cup springs encircling the axis of said spindle insert.

5. A device, as set forth in claim 2, wherein said spindle insert includes a punching die mounted in and movable with said spindle insert for cutting the lubricating bore into the interior of the hollow lug.

6. A device, as set forth in claim 5, including means for supplying compressed air to said spindle insert, said spindle insert having compressed air passageways therein extending from said means for supplying compressed air to the location of the contact of said punching die with the tubular member for blowing out any material displaced by the formation of the lubricating bore.

7. A device, as set forth in claim 5, wherein the interior surface of said pressure jaws extending from said punching die in the axial direction of said spindle insert toward said stationary abutment comprises a first circumferentially extending frusto-conical surface diverging in the direction toward said stationary abutment, a second circumferentially extending hemispherically shaped surface extending in the axial direction of said spindle insert from the end of said first surface closer to said stationary abutment toward said stationary abutment, and a third circumferentially extending frusto-conically shaped surface diverging outwardly from the end of said second surface closer to said stationary abutment toward said stationary abutment.

* * * * *